United States Patent
Lim (10) Patent No.: US 12,407,949 B2
(45) Date of Patent: Sep. 2, 2025

(54) OPTICAL SENSOR MECHANISM CAPABLE OF IMPROVING SIGNAL SENSITIVITY OF MOTION DETECTION AS WELL AS CONSUMING LOWER POWER

(71) Applicant: PixArt Imaging Inc., Hsin-Chu (TW)

(72) Inventor: Wooi Kip Lim, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 160 days.

(21) Appl. No.: 18/229,169

(22) Filed: Aug. 1, 2023

(65) Prior Publication Data
US 2025/0047991 A1 Feb. 6, 2025

(51) Int. Cl.
| | |
|---|---|
| H04N 25/53 | (2023.01) |
| G03B 7/093 | (2021.01) |
| G06T 7/20 | (2017.01) |
| H04N 25/62 | (2023.01) |
| H04N 25/771 | (2023.01) |

(52) U.S. Cl.
CPC ............. *H04N 25/53* (2023.01); *G03B 7/093* (2013.01); *G06T 7/20* (2013.01); *H04N 25/62* (2023.01); *H04N 25/771* (2023.01); *G06T 2207/10144* (2013.01)

(58) Field of Classification Search
CPC ...... H04N 25/53; H04N 25/62; H04N 25/771; H04N 25/707; G03B 7/093; G06T 7/20; G06T 2207/10144

USPC ......................................................... 348/297
See application file for complete search history.

(56) References Cited

U.S. PATENT DOCUMENTS

| | | | |
|---|---|---|---|
| 2009/0321641 A1* | 12/2009 | Park .......................... | G01J 5/20 257/E31.054 |
| 2019/0026901 A1* | 1/2019 | Fu ........................... | H04N 25/76 |
| 2020/0351417 A1* | 11/2020 | Hanwell ................ | H04N 23/45 |

* cited by examiner

*Primary Examiner* — Lin Ye
*Assistant Examiner* — Chan T Nguyen
(74) *Attorney, Agent, or Firm* — Winston Hsu (57) ABSTRACT

An optical sensor device includes a pixel array and a control circuit. The pixel array has pixel units arranged in N rows and M columns, and a pixel unit comprises: a photo transistor, configured to capture and generate a first image signal during a first shutter exposure time interval of a first time and to capture and generate a second image signal during a second shutter exposure time interval of a second time, the first time and the second time being consecutive; a first integration capacitor, coupled to the photo transistor, for storing the first image signal; and a second integration capacitor, coupled to the photo transistor, for storing the second image signal. The control circuit performs a motion detection to determine whether a motion occurs according to a difference between the two image signals.

23 Claims, 7 Drawing Sheets

OPTICAL SENSOR MECHANISM CAPABLE OF IMPROVING SIGNAL SENSITIVITY OF MOTION DETECTION AS WELL AS CONSUMING LOWER POWER

BACKGROUND OF THE INVENTION

1. Field of the Invention

The invention relates to an optical sensor mechanism, and more particularly to optical sensor devices and corresponding methods.

2. Description of the Prior Art

Generally speaking, the performance of a conventional optical sensor device is easily degraded due to different shot noise levels of different light conditions. For example, the conventional optical sensor device may detect a false motion caused by a higher shot noise. The conventional optical sensor device cannot accurately perform the motion detection. In addition, the conventional optical sensor may consume higher power.

SUMMARY OF THE INVENTION

Therefore one of the objectives of the invention is to provide optical sensor devices and methods to solve the above-mentioned problems.

According to an embodiment, an optical sensor device is disclosed. The optical sensor device comprises a pixel array and a control circuit. The pixel array has a plurality of pixel units arranged in N rows and M columns, and a first pixel unit in the plurality of pixel units comprise a photo transistor, a first integration capacitor, and a second integration capacitor. The photo transistor is configured to capture and generate a first image signal during a first shutter exposure time interval of a first time and to capture and generate a second image signal during a second shutter exposure time interval of a second time, and the first time and the second time are consecutive. The first integration capacitor is coupled to the photo transistor and used for storing the first image signal. The second integration capacitor is coupled to the photo transistor and used for storing the second image signal. The control circuit is coupled to the first pixel unit. The first shutter exposure time interval is different from the second shutter exposure time interval. The control circuit performs a motion detection to determine whether a motion occurs according to a difference between the first image signal captured during the first shutter exposure time interval and the second image signal captured during the second shutter exposure time interval.

According to an embodiment, a method of an optical sensor device is disclosed. The method comprises: providing the above-mentioned pixel array, configuring the first shutter exposure time interval to be different from the second shutter exposure time interval; and performing a motion detection to determine whether a motion occurs according to a difference between the first image signal captured during the first shutter exposure time interval and the second image signal captured during the second shutter exposure time interval.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of optical sensor devices having BJT sensing pixels and capable of accurately determining whether a motion occurs in the sensed images/frames as well as merely consuming low power.

Figure 1:
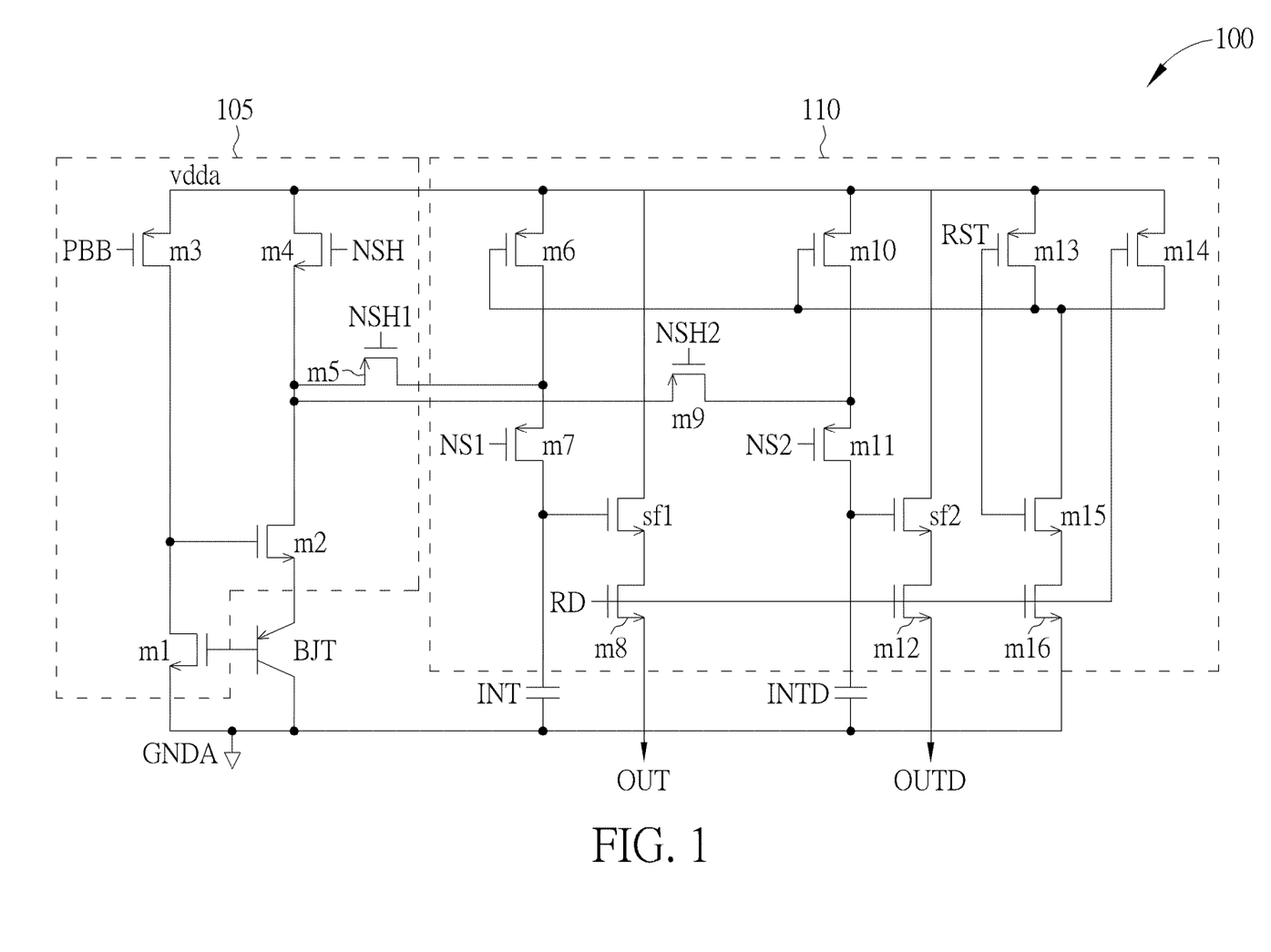
FIG. 1 is a circuit diagram of a novel pixel unit such as a bipolar junction transistor (BJT) sensing pixel (or referred to as a BJT pixel unit) disposed in a pixel array according to an embodiment of the invention.

Refer to FIG. 1. FIG. 1 is a circuit diagram of a novel pixel unit 100 such as a bipolar junction transistor (BJT) sensing pixel (or referred to as a BJT pixel unit) disposed in a pixel array according to an embodiment of the invention. As shown in FIG. 1, the BJT sensing pixel 100 comprises a photo transistor such as a BJT-based photo sensing transistor BJT, a shutter control circuit 105, a readout control circuit 110, a first integration capacitor INT, and a second integration capacitor INTD. The shutter control circuit 105 comprises MOS transistors such as NMOS (N-channel MOS) transistors m1, m2, m4, and PMOS (P-channel) transistors m3 and m5. The readout control circuit 110 comprises multiple MOS transistors m6-m16, and two source follower transistors sf1 and sf2.

As shown in FIG. 1, for example, the transistor m1 has a first terminal (e.g. a drain terminal) coupled to the control terminal (e.g. a gate terminal of transistor m2) and a first terminal (e.g. the drain terminal) of transistor m3, a second terminal (e.g. a source terminal) coupled to the ground level GNDA, and a control terminal (gate terminal) coupled to the base of the BJT transistor BJT. The transistor m2 has the gate terminal coupled to the drain terminal of transistor m1 and the drain terminal of transistor m3, has the drain terminal coupled to the source terminal of transistor m4, source terminal of transistor m5, and source terminal of transistor m9, and has the source terminal coupled to the emitter of the BJT transistor BJT. The transistor m3 has the gate terminal coupled to the control signal PBB, the source terminal coupled to the supply voltage vdda such as 1.8 Volts (but not limited), and the drain terminal coupled to the gate terminal of transistor m2 and drain terminal of transistor m1. The circuit structures and connections of the other MOS transistors are shown in FIG. 1.

Particularly, the transistor m5 has the gate terminal coupled to the control signal NSH1, has the source terminal coupled to the drain terminal of transistor m2, and has the drain terminal coupled to the drain terminal of transistor m6 and source terminal of transistor m7. The transistor m7 has the gate terminal coupled to the control signal NS1, has the source terminal coupled to the drain terminal of transistor m6, and has the drain terminal coupled to the first integration capacitor INT and the gate terminal of the source follower transistor sf1. The first integration capacitor INT has the first end coupled to the drain terminal of transistor m7 and gate terminal of source follower transistor sf1, and has a second end coupled to the ground level GNDA. The source follower transistor sf1 has a drain terminal coupled to the supply voltage vdda, has a source terminal coupled to the drain terminal of the transistor m8, and has a gate terminal coupled to the drain terminal of transistor m7 and the first integration capacitor INT.

In addition, the transistor m9 has the gate terminal coupled the control signal NSH2, has the source terminal coupled to the drain terminal of transistor m2, source terminal of transistor m4, and source terminal of transistor m5, and has the drain terminal coupled to the drain terminal of transistor m10 and source terminal of transistor m11. The transistor m11 has the gate terminal coupled to the control signal NS2, the source terminal coupled to the drain terminal of transistor NSJH2, and has the drain terminal coupled to the gate terminal of source follower transistor sf2 and the second integration capacitor INTD. The second integration capacitor INTD has the first end coupled to the drain terminal of transistor m11 and gate terminal of source follower transistor sf2, and has the second end coupled to the ground level GNDA. The source follower transistor sf2 has the drain terminal coupled to the supply voltage vdda, has the gate terminal coupled to the drain terminal of transistor m11 and the first end of second integration capacitor INTD, and has the source terminal coupled to the drain terminal of the transistor m12.

Figure 3:
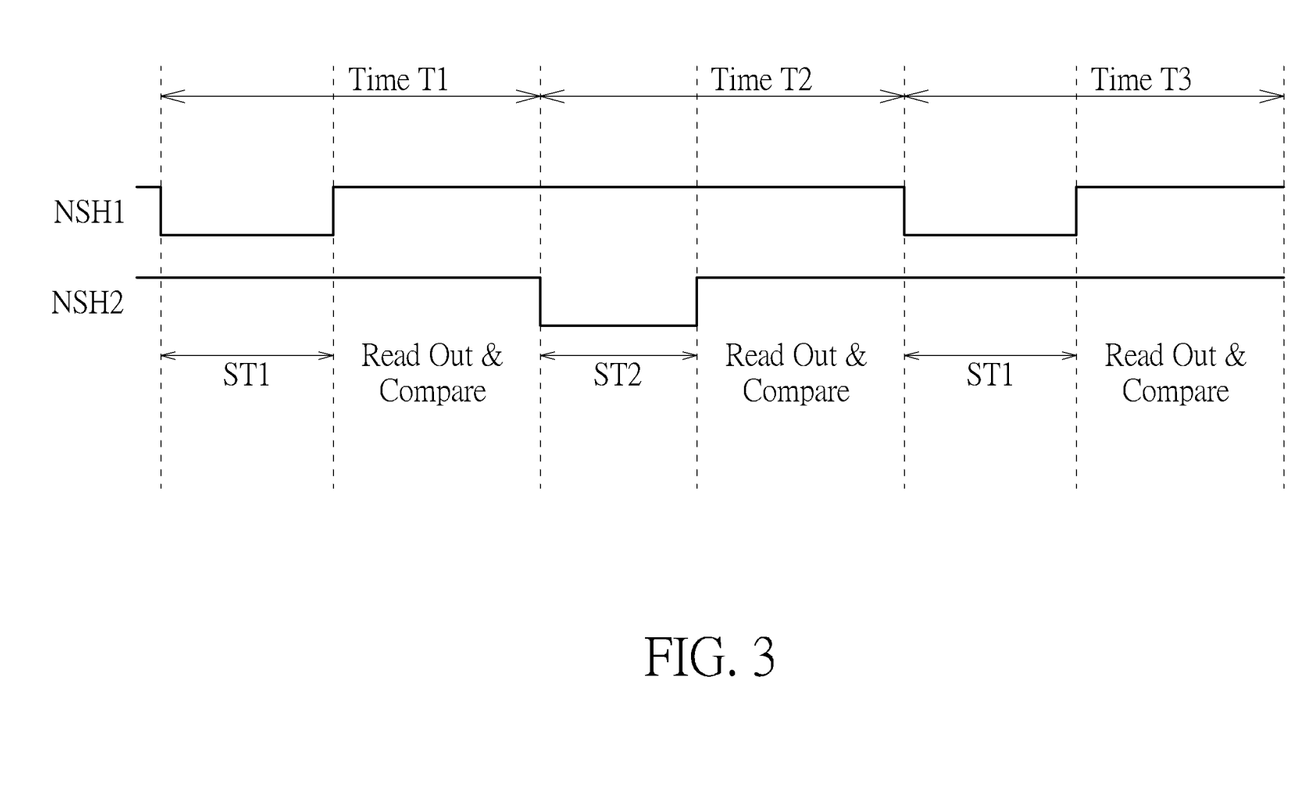
FIG. 3 is a diagram showing an example of the shutter exposure time intervals of times T1-T3 according to an embodiment of the invention.

In this embodiment, the control signals PBB, NSH, NSH1, and NS1 can be used to respectively control (turn on/off) the transistors m3, m4, m5, and m7 to collect a light signal and transfer the charge of the light signal from the BJT photo transistor into the first integration capacitor INT during a first shutter exposure time interval ST1 at time T1, so that the light signal collected/captured at time T1 can be stored in the first integration capacitor INT. The control signal RD is a read control signal, and then the transistor m8 can be turned on by the control signal RD to work with the first source follower transistor sf1 to generate and output the first output signal OUT corresponding to the light signal collected at time T1. Identically, the control signals PBB, NSH, NSH2, and NS2 can be used to respectively control (turn on/off) the transistors m3, m4, m9, and m11 to collect a light signal and transfer the charge of the light signal from the BJT photo transistor into the second integration capacitor INTD during a second shutter exposure time interval ST2 at time T2, so that the light signal collected/captured at time T2 can be stored in the second integration capacitor INTD. Then the transistor m12 can be turned on by the control signal RD to work with the second source follower transistor sf2 to generate and output the second output signal OUTD corresponding to the light signal collected at time T2. Similarly, the light signal can be collected during the first shutter exposure time interval ST1 at time T3 following time T2, and the light signal can be collected during the second shutter exposure time interval ST2 at time T4 following time T3. FIG. 3 shows an example of the shutter exposure time intervals of times T1-T3 according to an embodiment of the invention. Further, the control signal RST, i.e. a reset control signal, is coupled to the gate terminal of transistors m13 and m15 to control the transistors m13 and m15 to reset the operation of readout control circuit 110 and is not detailed for brevity.

By doing so, based on the circuit structure of each BJT sensing pixel 100 in FIG. 1, two light signals can be collected at different times respectively. At time T1, the control signals NSH1 and NS1 are at a low level such as level '0' to select and turn on the corresponding PMOS transistors m5 and m7, and the control signals NSH2 and NS2 are at a high level such as level '1' and thus the PMOS transistors m9 and m11 are not turned on (i.e. not selected). In this situation, a first collected light signal/data can pass through the turned-on PMOS transistors m5 and m7, and thus it is stored into the first integration capacitor INT. Then, at time T2 (later than time T1), the control signals NSH2 and NS2 are at the low level and thus the corresponding PMOS transistors m9 and m11 are selected and turned on, and the control signals NSH1 and NS1 are at the high level and thus the PMOS transistors m5 and m7 are not turned off (not selected). In this situation, a second collected light signal/data can pass through the corresponding turned-on PMOS transistors m9 and m11 and it is stored into the second integration capacitor INTD. That is, the first integration capacitor INT and second integration capacitor INTD respectively have two light data/signals which are collected at different times.

Equivalently, when the control signal RD is at the high level, the transistors m8 and m12 are turned on respectively, and the two light signals are read and transferred out as the first output signal OUT and second output signal OUTD respectively. Actually, the first light signal is read out from the integration capacitor INT when the control signal RD is at the high level and the control signal NSH1 switches from the low level into the high level, and then the second light signal is read out from the integration capacitor INTD when the control signal RD is at the high level and the control signal NSH2 switches from the low level into the high level, as shown in FIG. 3.

Figure 2:
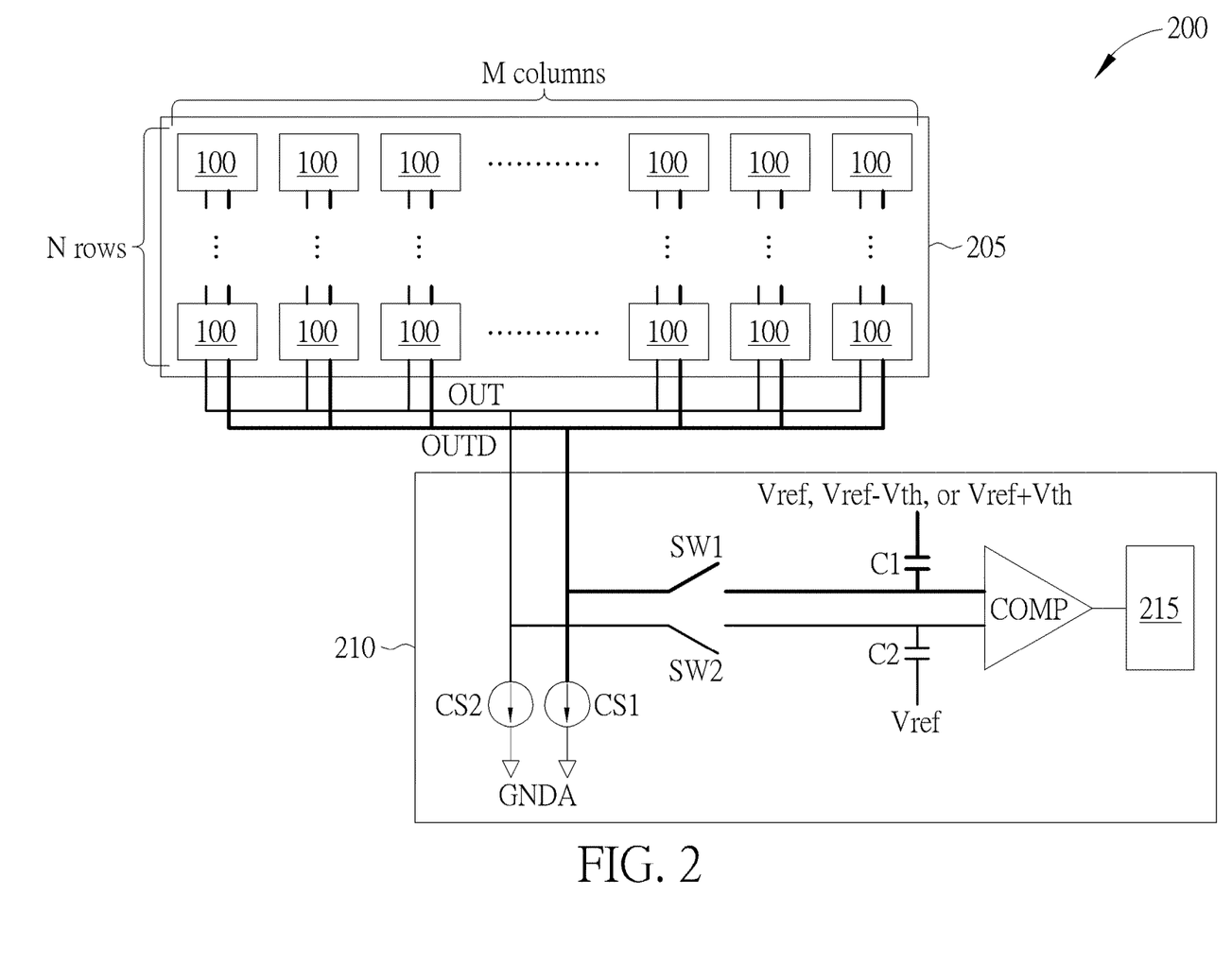
FIG. 2 is a diagram of an optical sensor device comprising multiple BJT sensing pixels in FIG. 1 according to an embodiment of the invention.

Refer to FIG. 2. FIG. 2 is a diagram of an optical sensor device 200 comprising multiple BJT sensing pixels 100 according to an embodiment of the invention. In FIG. 2, the optical sensor device 200 comprises a pixel array 205 and a control circuit 210. The pixel array 205 comprises a plurality of pixel units such as the BJT sensing pixels 100 of FIG. 1 arranged in N rows and M columns. Each BJT sensing pixel 100 is arranged to output its two output signals OUT and OUTD to the control circuit 210 at different times. The control circuit 210 is used to generate the above-mentioned control signals PBB, NSH, NSH1, NS1, NSH2, NS2, RST, and RD to each BJT sensing pixel 100 respectively so as to obtain and receive two output signals OUT and OUTD of the each BJT sensing pixel 100.

In practice, the control circuit 210 comprises a first current source CS1, a second current source CS2, a first switch unit SW1, a second switch unit SW2, a first buffer capacitor C1, a second buffer capacitor C2, a comparator COMP, and a counter 215.

In FIG. 2, for one BJT sensing pixel 100, the first integration capacitor's INT output signal OUT and the second integration capacitor's INTD output signal OUTD are transmitted into the control circuit 210. The current sources CS1 and CS2 are used for providing reference current signals for the output signals OUT and OUTD. The first switch unit SW1 and second switch unit SW2 are controlled to be at the closed state. The output signals OUT and OUTD can be transferred through the switch unit SW2 and switch unit SW1 and then are stored by the buffer capacitor C2 and buffer capacitor C1 with bias voltages Vref on the other plates of capacitors C1-C2.

The control circuit 210 is arranged to receive the two output signals OUT and OUTD to check the difference when the first switch unit SW1 and second switch unit SW2 are turned on to be at a closed state (i.e. a conductive state). Then, the first switch unit SW1 and second switch unit SW2 are turned off to be non-conductive after the two output signals OUTD and OUT are respectively stored by the two buffer capacitors C1 and C2, respectively.

After the first and second switch units SW1 and SW2 are turned off to be at an open state (i.e. non-conductive state), the bias voltage provided at the other plate of the buffer capacitor C2 is controlled by the control circuit 210 to be kept at Vref while the bias voltage provided at the other plate of the buffer capacitor C1 is controlled by the control circuit 210 to sweep from Vref to Vref–Vth and Vref+Vth; for example (but not limited), the bias voltage may sweep from Vref to Vref–Vth and then sweep from Vref–Vth to Vref+Vth. That is, the control circuit 210 controls the bias voltage provided at the other plate of the buffer capacitor C2 sweeping or switching into a different reference voltage level for two times. It should be noted that, in this embodiment (but not limited), Vth is a threshold voltage used/configured by the comparator COMP (or by the control circuit 210) in a global setting applied to all the BJT sensing pixels 100 included within the pixel array 205. However, this is not intended to be a limitation. For instance, the threshold voltage Vth may be at different levels for different BJT sensing pixels 100 in the pixel array 205.

The comparator COMP compares the waveform of output signal OUTD centered at the level Vref–Vth with that of the output signal OUT centered at the level Vref to generate a first comparison resultant bit/signal and then compares the waveform of output signal OUTD centered at the level Vref+Vth with that of the output signal OUT centered at the level Vref to generate a second comparison resultant bit/signal, so as to sequentially generate and output the two comparison resultant bits/signals into the counter 215. Based on the first and second comparison resultant bits, the counter 215 can determine whether the second output signal OUTD collected at time T2 is dimmer/brighter than the first output signal OUT collected at time T1 or not.

For example (but not limited), if the second output signal OUTD collected at time T2 is dimmer than the first output signal OUT collected at time T1 due to an enough/significant pixel change, then the first and second comparison resultant bits may indicate '11', and thus a counting value (the initial value is equal to zero) counted by the counter 215 is accumulated and incremented by one so as to recording a significant pixel difference.

If the second output signal OUTD collected at time T2 is brighter than the first output signal OUT collected at time T1 due to an enough/significant pixel change, then the first and second comparison resultant bits may indicate '00', and thus the counting value (the initial value is equal to zero) counted by the counter 215 is also accumulated and incremented by one so as to recording a significant pixel difference. If the first and second comparison resultant bits may indicate '01' and '10', then the counting value is not increased and not accumulated.

For all BUT sensing pixels 100 of the pixel array 205, the counter 215 is arranged to use its counting value to accumulate the number of BJT sensing pixels in the whole pixel array 205 that have significant pixel differences corresponding to the comparison resultant bits '11' or '00'. The control circuit 210 is arranged to compare the counting value with a preset threshold of count number to determine whether a motion occurs to generate a motion signal which can be used and triggered to wake up an entire sensor system which the optical sensor device 200 disposed in. For example, when the accumulated counting value is greater than the preset threshold of count number, the control circuit 210 (or optical sensor device 200) can determine that a motion occurs and in other situations the control circuit 210 can determine that no motions occur.

Refer back to FIG. 3. In FIG. 3, at time T1, the control signal NSH1 becomes at the low level to select and turn on the transistor m5. During the shutter exposure time interval ST1 of time T1, the control signal NS1 also turns on the transistor m7 while the control signal RD turns off the transistor m8, so that the charge will be stored by the first integration capacitor INT. Then, during time's T1 second time interval (i.e. read out and compare interval) following the shutter exposure time interval ST1, the control signal NSH1 becomes at the high level to turn off the transistor m5, the control signal NSH2 is kept at the high level to turn off the transistor m9, and the control signal RD turns on the transistor m8 to make the first integration capacitor INT transfer the stored charge out the BJT sensing pixel 100 as the first output signal OUT and transmit the first output signal OUT to the control circuit 210. During time's T1 read out and compare interval, the first output signal OUT is transmitted to the control circuit 210, and the control circuit 210 compares the currently received first output signal OUT with the previously received/stored second output signal OUTD based on the operations of sweeping the bias voltage at the other plate of the buffer capacitor C1 as shown in FIG. 2 so as to determine whether a significant pixel difference occurs between the output signals OUT and OUTD. Once a significant pixel difference occurs, the counting value counted by the counter 215 is incremented by one.

It should be noted that, during the shutter exposure time interval ST1, all the BJT sensing pixels 100 of the whole pixel array 205 are used to sense light rays (which may be reflected from a working surface), and then during time's T1 read out and compare interval, the control circuit 210 (or optical sensor device 200) checks whether more or all the BJT sensing pixels 100 of the whole pixel array 205 is/are associated with the significant pixel difference so as to calculate and accumulate the specific counting value at time T1 for more or all the BJT sensing pixels 100. If the accumulated specific counting value at time T1 is greater than the preset threshold of count number, then the control circuit 210 determines that a motion occurs at time T1.

Similarly, during the shutter exposure time interval ST2 at time T2, the control signal NSH2 becomes at the low level to select and turn on the transistor m9. During the shutter exposure time interval ST2, the control signal NS2 also turns on the transistor m11 while the control signal RD turns off the transistor m12, so that the charge will be stored by the second integration capacitor INTD. Then, during time's T2 second time interval (i.e. read out and compare interval) following the shutter exposure time interval ST2, the control signal NSH2 becomes at the high level to turn off the transistor m9, the control signal NSH1 is kept at the high level to turn off the transistor m5, and the control signal RD turns on the transistor m12 to make the second integration capacitor INTD transfer the stored charge out the BJT sensing pixel 100 as the second output signal OUTD and transmit the second output signal OUTD to the control circuit 210.

During time's T2 read out and compare time interval, the second output signal OUTD is transmitted to the control circuit 210, and then the control circuit 210 compares the currently received second output signal OUTD with the previously received first output signal OUT (i.e. the output signal collected at the above-mentioned time interval ST1) based on the operations of sweeping the bias voltage at the other plate of the buffer capacitor C1 as shown in FIG. 2 so as to determine whether a significant pixel difference occurs between the output signals OUT and OUTD. Once a significant pixel difference occurs, the counting value counted by the counter 215 is incremented by one.

Similarly, during the shutter exposure time interval ST2 at time T2, all the BJT sensing pixels 100 of the whole pixel array 205 are used to sense light rays (which may be reflected from the working surface), and then during time's T2 read out and compare interval, the control circuit 210 (or optical sensor device 200) checks whether more or all the BJT sensing pixels 100 of the whole pixel array 205 is/are associated with the significant pixel difference so as to calculate and accumulate the specific counting value at time T2 for more or all the BJT sensing pixels 100. If the accumulated specific counting value at time T2 is greater than the preset threshold of count number, then the control circuit 210 determines that a motion occurs at time T2.

The above-mentioned operations are similar or identical for time T3. During the shutter exposure time interval ST1 at time T3, all the BJT sensing pixels 100 of the whole pixel array 205 are used to sense light rays (which may be reflected from the working surface), and then during time's T3 read out and compare interval, the control circuit 210 (or optical sensor device 200) checks whether more or all the BJT sensing pixels 100 of the whole pixel array 205 is/are associated with the significant pixel difference so as to calculate and accumulate the specific counting value at time T3 for more or all the BJT sensing pixels 100. If the accumulated specific counting value at time T3 is greater than the preset threshold of count number, then the control circuit 210 determines that a motion occurs at time T3. The other operations are similar and are not detailed for brevity.

Further, equivalently the photo transistor BJT of one BJT sensing pixel 100 is configured to capture and generate an image signal (pixel image) during the shutter exposure time interval ST1 and then generate another image signal during the shutter exposure time interval ST2 which equivalently follows the shutter exposure time interval ST1 since time T2 follows time T1. The two pixel images are stored by the two integration capacitors INT and INTD, as mentioned in the above paragraphs. In addition, the motion detection performed by the optical sensor device 200 (or control circuit 210) is to determine whether a motion occurs based on the difference between the two pixel images captured at different shutter exposure time intervals having identical/different time lengths. In addition, in one embodiment, the employed shutter exposure time interval may alter between the different shutter exposure time intervals having different time lengths. The first shutter exposure time interval ST1 and the second shutter exposure time interval ST2 alternately occur for consecutive times.

The provided optical sensor device 200 having the multiple BJT sensing pixels 100 can be used to boost/improve the sensitivity of the motion detection operation and can be arranged to wake up the sensor system during the rest or idle period without the need of running full digital operations. The optical sensor device 200 can boost the sensitivity of a sensor to detect changes in the image, i.e. motion.

In the embodiment, for example (but not limited), when the pixel value corresponding to the second output signal OUTD collected at time T2 is above or below to a threshold pixel value corresponding to the threshold voltage Vth, the control circuit 210 can determine that the BJT sensing pixel's 100 pixel value at time T2 is brighter or dimmer than that at time T1.

In one embodiment, the threshold voltage Vth is configured to be high enough to avoid false motion caused by the shot noise of the images.

In other embodiments, when the pixel unit 100 senses a brighter light, the shot noise content in the output signal OUT/OUTD also will increase proportionally, and the control circuit 210 can dynamically adjust the threshold voltage Vth to increase the threshold voltage Vth applied for the increased shot noise level and maintains the threshold voltage Vth applied for the kept shot noise level so as to mitigate the those different noise levels.

For example (but not limited), if the voltage level of an output signal of a brighter pixel unit (i.e. having a high pixel value) is 500 mV, then its peak-to-peak shot noise level may be ±10 mV. In this situation, the threshold voltage Vth may be configured to be equal to or higher than the absolute value of ±10 mV to avoid false motion. Actually, a sensed image may comprise high/medium/low pixel values; for instance, the voltage level of an output signal of a pixel unit having a low pixel value may be 250 mV, then its peak-to-peak shot noise level may be ±5 mV. In this situation, it is merely needed to configure the threshold voltage Vth be equal to or higher than the absolute value of ±5 mV to avoid false motion. The sensitivity of motion detection operation will be degraded if the threshold voltage Vth is always higher for the all pixel units.

To solve this problem, in one embodiment, the control circuit 210 can dynamically adjust the threshold voltage Vth for different pixel units 100. That is, the optical sensor device 200 may use a high threshold voltage for a pixel unit having a high pixel value to mitigate a high shot noise level, a medium threshold voltage for a pixel unit having a medium pixel value to mitigate a medium shot noise level, and a low threshold voltage for a pixel unit having a low pixel value to mitigate a low shot noise level. Using a medium threshold voltage to mitigate a medium shot noise level and/or using a low threshold voltage to mitigate a low shot noise level can boost the signal sensitivity of the motion detection operation as well as accurately avoiding false motions.

It may be hard to adaptively adjust the threshold voltage Vth for different pixel units 100 of the pixel array 205 in some situations. To solve the problems, the invention provides the operation of dynamically adjusting shutter exposure time intervals at consecutive times to equivalently achieve boosting the signal sensitivity of motion detection, and in the embodiments it is not needed to directly adjust the threshold voltage Vth for different pixel units 100 of the pixel array 205. For example, in the embodiments, to boost the signal sensitivity of motion detection operation, the control circuit 210 can dynamically adjust or vary the shutter time intervals of different times such as T1, T2, and T3 to obtain/get different sensed images then to compare the sensed images. The operation of dynamically adjust or vary the shutter time intervals of the different times such as T1, T2, and T3 can be used to replace the operation and function of the threshold voltage Vth. The threshold voltage Vth may be configured as zero, and it is not needed to sweep the bias voltage Vref to both of Vref−Vth and Vref+Vth, and the comparator COMP can directly compare the output signals OUTD and OUT to generate a comparison resultant bit/signal into the counter 215.

Refer to FIG. 3 again. For a specific pixel unit 100 (or most or all pixel units), the control circuit 210 can control the exposure time intervals of consecutive times corresponding to consecutive images/frames to have different time lengths. For example, the shutter exposure time interval ST1 at time T1 for the specific pixel unit 100 at a first image, i.e. the interval during which the control signal NSH1 is at the low level, is equal to a longer exposure time interval such as 10 us (but not limited). The shutter exposure time interval ST2 at time T2 for the specific pixel unit 100 at a second image, i.e. the interval during which the control signal NSH2 is at the low level, is equal to a shorter exposure time interval (e.g. 9 us) shorter than the exposure time interval 10 us. The shutter exposure time interval ST1 at time T3 for the specific pixel unit 100 at a third image, i.e. the interval during which the control signal NSH1 is at the low level again, is equal to the longer exposure time interval 10 us. That is, the control circuit 210 (or optical sensor device 200) can control its shutter exposure time interval switching and alternating between the longer and shorter time intervals at consecutive times.

If no motions occur, then the pixel value of the specific pixel unit 100 collected at the shutter exposure time interval ST2 should be dimmer than that of the specific pixel unit 100 collected at the shutter exposure time interval ST1 since the shutter exposure time interval ST2 is shorter than the shutter exposure time interval ST1. In this situation, the second output signal OUTD is lower/dimmer than the first output signal OUT and the comparator COMP generates the comparison resultant bit '1' into the counter 215 if no motions occur between two consecutive shutter exposure operations/intervals. If a motion occurs, then for example (but not limited) the pixel value of the specific pixel unit 100 collected at the shutter exposure time interval ST2 may significantly change and become brighter than that of the specific pixel unit 100 collected at the shutter exposure time interval ST1. In this situation, the output of comparator COMP will toggle to bit '0' to preliminarily indicate that a significant change occurs in the pixel unit 100. By collecting the comparison resultant bits of most/all pixel units 100 of the pixel array 205 sequentially outputted from the comparator COMP, the counter 215 can count and accumulate the number of bits '0' and then compare the number of bits '0' with a specific threshold number to finally determine whether a motion occurs in the image collected during the shorter shutter exposure time interval ST2. For example, the optical sensor device 200 (or control circuit 210) can decide that a motion occurs at a specific time such as T2 if the number of bits '0' corresponding to the shorter shutter exposure time interval ST2 is greater than the specific threshold number.

In one embodiment, if it is detected that a motion occurs at time T2, then the control circuit 210 may stop toggling/alternating the shutter exposure time interval between ST1 and ST2 and may use one of ST1 and ST2 as the shutter exposure time interval and keeps the shutter exposure time interval. This is not intended to be a limitation of the invention.

In other embodiments, if it is detected that no motions occur at time T2, then the control circuit 210 may continue to toggle the shutter exposure time interval between ST1 and ST2 to perform a motion detection operation. For example (but not limited), assume that the comparator COMP generates the comparison resultant bit '1' into the counter 215 if no motions occur at time T2, the control circuit 210 at time T3 controls and toggles the shutter exposure time interval back to the longer shutter exposure time interval ST1. If no motions occur at time T3, then the pixel value of the specific pixel unit 100 collected during the longer shutter exposure time interval ST1 of time T3 should be brighter/higher than that of the specific pixel unit 100 collected during the shorter shutter exposure time interval ST2 of time T2, and thus the comparator COMP generates and outputs the comparison resultant bit '0' to indicate no motions at time T3. In this example, if a motion occurs at time T3, then for example (but not limited) the pixel value of the specific pixel unit 100 collected during the longer shutter exposure time interval ST1 of time T3 may significantly change and become dimmer than that of the specific pixel unit 100 collected during the shorter shutter exposure time interval ST2 of time T2, and thus in this situation the output of comparator COMP will toggle to bit '1' to preliminarily indicate that a significant pixel change occurs in the pixel unit 100 at time T3. Then, by collecting the comparison resultant bits of most/all pixel units 100 in the pixel array 205 sequentially outputted from the comparator COMP, the counter 215 can count and accumulate the number of bits '1' and then compare the number of bits '1' with a specific threshold number to finally determine whether a motion occurs in the image collected during the longer shutter exposure time interval ST1. For example, the optical sensor device 200 (or control circuit 210) can decide that a motion occurs at a specific time such as T3 if the number of bits '1' corresponding to the longer shutter exposure time interval ST1 is greater than the specific threshold number.

In one embodiment, the control circuit 210 can finally determine that a motion occurs only when at least detecting that the number of bits '1' corresponding to the longer shutter exposure time interval ST1 is greater than the specific threshold number and at least detecting that the number of bits '0' corresponding to the shorter shutter exposure time interval ST2 is greater than the specific threshold number at consecutive times. This modification also falls within the scope of the invention.

In other embodiment, the control circuit 210 may individually and respectively adjust and vary the shutter exposure time intervals of the different pixel units 100 within the pixel array 205 based on the different pixel output levels of the different pixel units 100.

Figure 4:
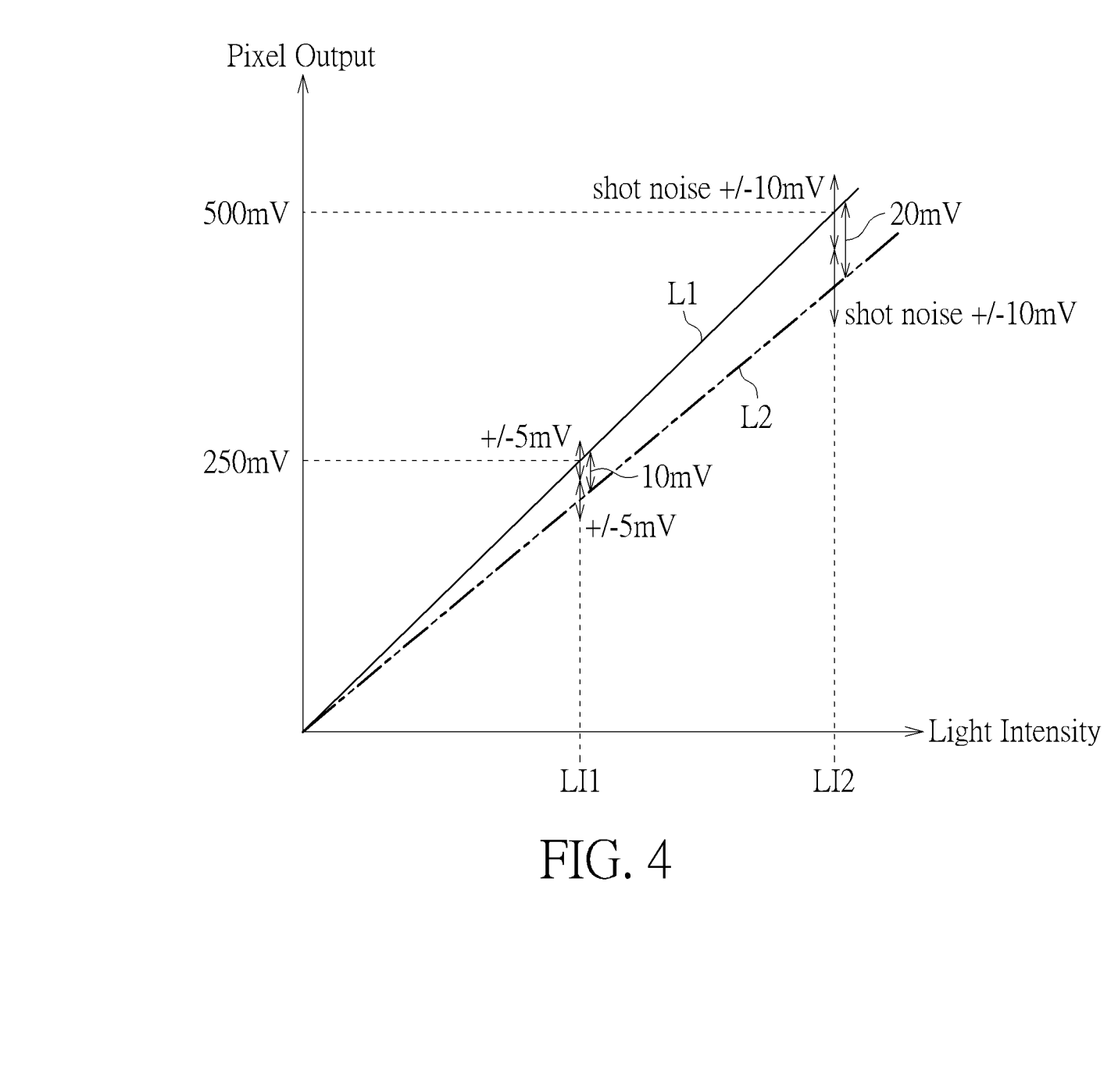
FIG. 4 is a diagram of examples showing the relation between the light intensity and pixel output signal voltage level according to an embodiment of the invention.

FIG. 4 is a diagram of examples showing the relation between the light intensity and pixel output signal voltage level according to an embodiment of the invention. In FIG. 4, the line L1 indicates the relation between the light intensity and pixel output signal voltage level under a condition of using the longer shutter exposure time interval ST1, and the line L2 indicates the relation between the light intensity and pixel output signal voltage level under a condition of using the shorter shutter exposure time interval ST2. For example (but not limited), at a low light intensity LI1, the pixel output voltage level collected during the longer shutter exposure time interval ST1 may be 250 mV plus ±5 mV shot noise level. At a high light intensity LI2, the pixel output voltage level collected during the longer shutter exposure time interval ST1 may be 500 mV plus ±10 mV shot noise level. That is, the shot noise level is proportionally increased with the light intensity. As mentioned above, the control circuit 210 may adjust the threshold voltage Vth in response to the different light intensities so as to avoid detecting false motion caused by the shot noise as well as to maintain the signal sensitivity of motion detection.

In the embodiments, to provide an equivalent threshold voltage to avoid false motion by toggling between the longer shutter exposure time interval ST1 and shorter shutter exposure time interval ST2, the control circuit 210 (or optical sensor device 200) can determine the line L2 as shown in FIG. 4 based on the pixel output voltage level 250 mV plus ±5 mV shot noise level corresponding to the low light intensity LI1 and the pixel output voltage level 500 mV plus ±10 mV shot noise level corresponding to the high light intensity LI2. For instance, the optical sensor device 200 can finely tune or adjust the actual time length of the shorter shutter exposure time interval ST2 to make the corresponding the line L2 be below the line L1 and be separated by enough discrimination voltage ranges. For example, the control circuit 210 can configure the discrimination voltage range at the high light intensity LI2 be equal to two times of the absolute value of ±10 mV shot noise level, i.e. 20 mV shown in FIG. 4. The control circuit 210 can configure the discrimination voltage range at the low light intensity LI2 be equal to two times of the absolute value of ±5 mV shot noise level, i.e. 10 mV as shown in FIG. 4.

By doing so, the optical sensor device 200 can find and obtain the finely tuned time length of the shorter exposure time interval ST2, e.g. 9 us (but not limited). In practice, the control circuit 210 can directly and respectively control the shutter control circuits 105 of different BJT sensing pixels 100 providing and using the shutter exposure time intervals having different time lengths, and this is more convenient and flexible compared to the operation of dynamically adjusting the value of threshold voltage Vth as shown in FIG. 2 for different BJT sensing pixels 100. In addition, the performance of adjusting the exposure time intervals for different BJT sensing pixels 100 is improved, compared to using the fixed value of threshold voltage Vth for all the BJT sensing pixels 100.

In other embodiments, the comparison operation, executed by the control circuit 210 and sequentially upon one BJT sensing pixel by one BJT sensing pixel, can be replaced by using a built-in comparison mechanism disposed within each BJT sensing pixel, so as to further reduce the power consumption to achieve for low power motion detection requirements.

Figure 5:
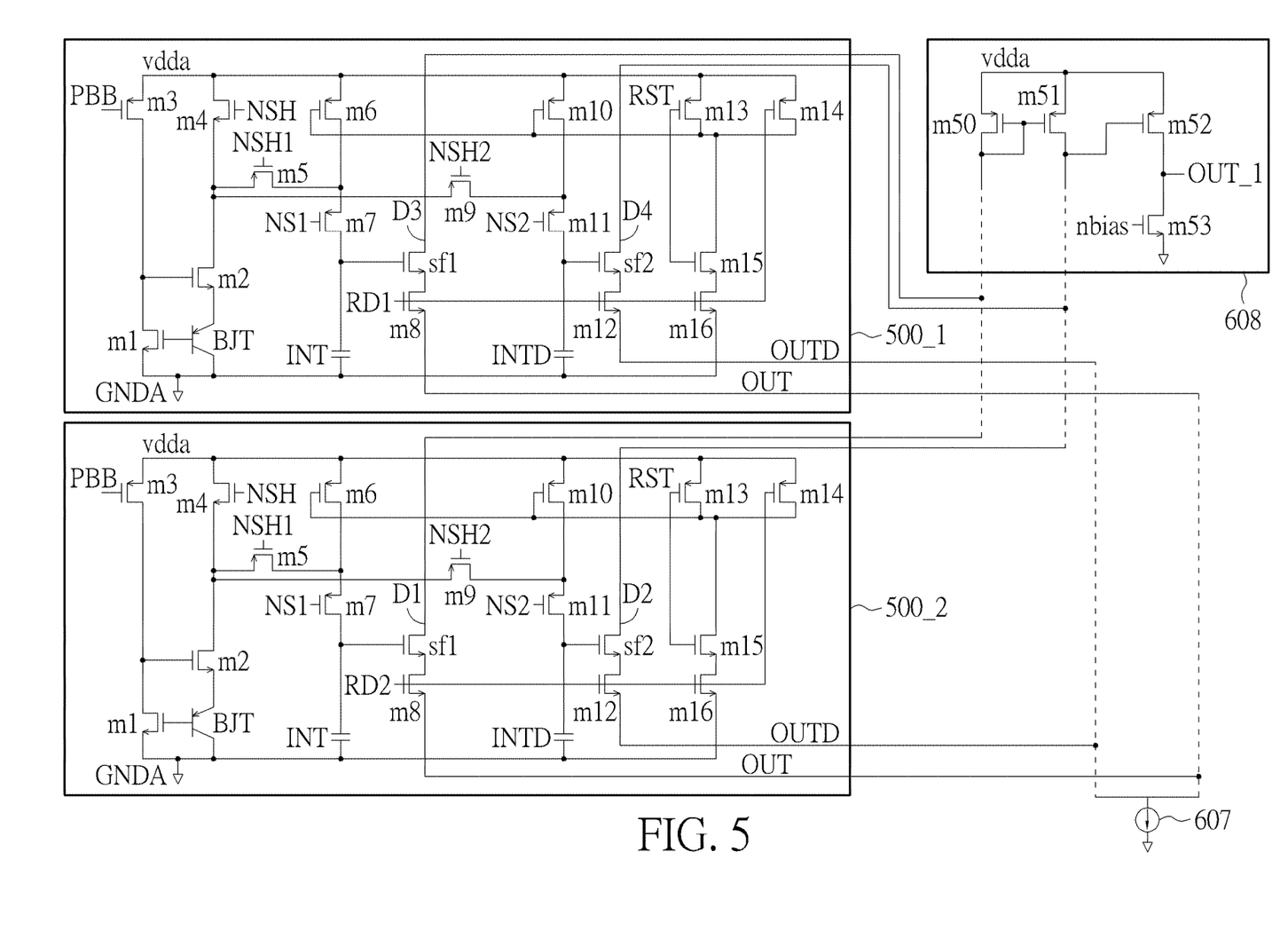
FIG. 5 is a circuit diagram of two novel BJT sensing pixels disposed at different spatial locations of the same column of a pixel array according to an embodiment of the invention.
Figure 6:
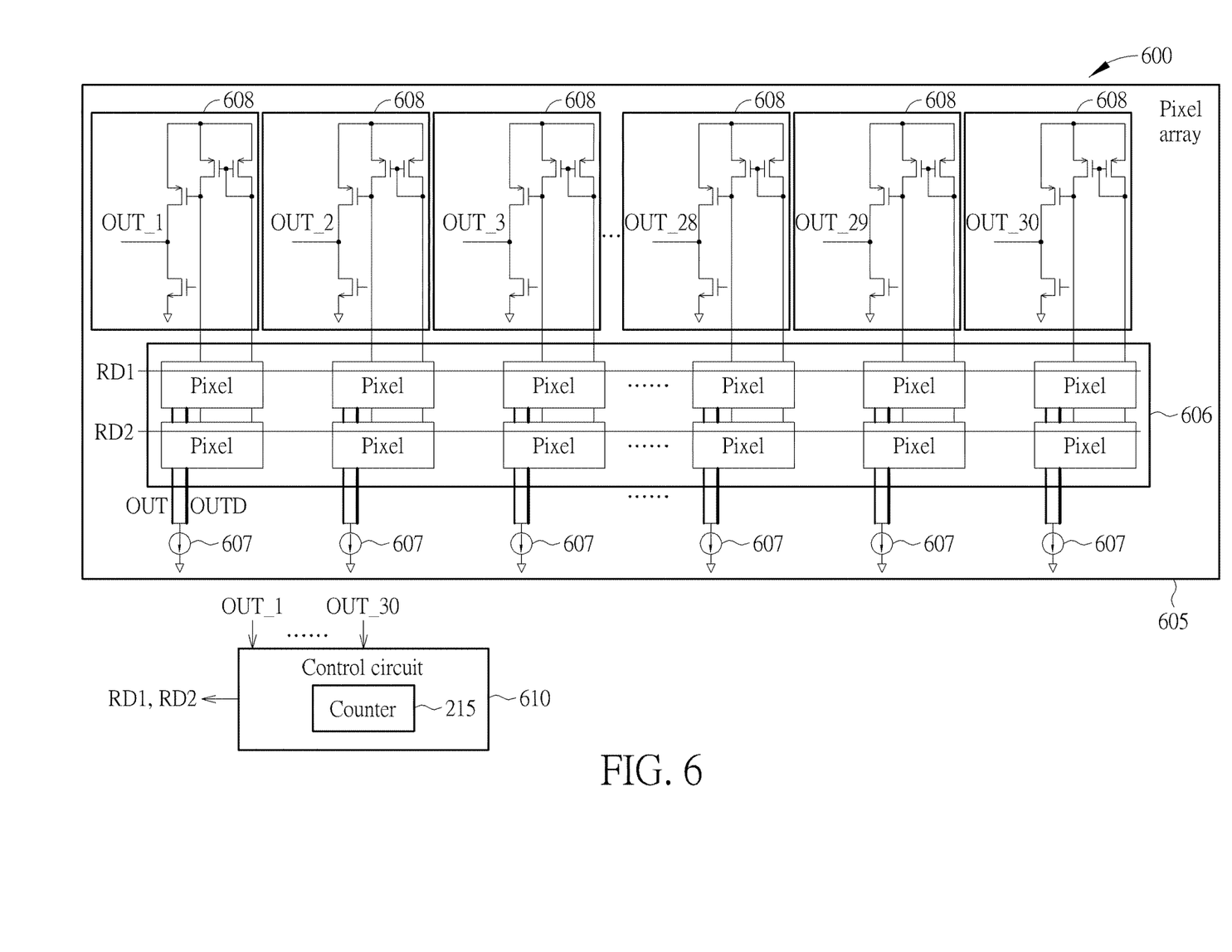
FIG. 6 is a diagram of an optical sensor device according to an embodiment of the invention.

Refer to FIG. 5 in conjunction with FIG. 6. FIG. 5 is a circuit diagram of two novel BJT sensing pixels disposed at different spatial locations of the same column of a pixel array according to an embodiment of the invention. FIG. 6 is a diagram of an optical sensor device 600 according to an embodiment of the invention. The optical sensor device 600 comprises the pixel array 605 and the control circuit 610 having the counter 215, wherein the pixel array 605 comprises the array circuit 606 having the BJT sensing pixels of FIG. 5 arranged in N rows and M columns, M column-based bias current sources 607 arranged in one row and M columns, and M column-based built-in comparison circuits 608 arranged in one row and M columns; the integer N for example is equal to two (but not limited), and the integer M is equal to 30 (but not limited).

The pixel array 605 can simultaneously generate and output M comparison resultant signals OUT_1-OUT_M (e.g. M is 30) of each row into the control circuit 610. For example, the pixel array 605 has two rows, and the pixel array 605 can generate a set of comparison resultant signals OUT_1-OUT_30 into the control circuit 610 and then generate another set of comparison resultant signals OUT_1-OUT_30 into the control circuit 610; that the, the control circuit 610 receives comparison resultant signals OUT_1-OUT_M (e.g. M is 30) for N times; N for example is 2.

The control circuit 610 is coupled to the pixel array 605 and is used for generating the read control signals of N rows such as RD1 for the first row and RD2 for the second row into the pixel array 605 to make the pixel array 605 outputting the M comparison resultant signals at the first row in response to the control signal RD1 and then make the pixel array 605 outputting the M comparison resultant signals at the second row in response to the control signal RD2, and for controlling the counter 215 receiving the M comparison resultant signals of each row of the pixel array 605 to count the total number of specific bits '1' or '0' indicating the significant pixel changes. That is, the control circuit 610 excludes the comparison operation.

Refer back to FIG. 5. FIG. 5 shows the two novel BJT sensing pixels 500_1 and 500_2 at the same column (e.g. the first column) of the pixel array 605, one column-based bias current source 607 disposed at the same column, and one built-in column-based comparison circuit 608 disposed at the same column. The BJT sensing pixels 500_1 and 500_2 have the same circuit structures and components. For instance, the BJT sensing pixel 500_1 (or 500_2) comprises the circuit elements/structures similar to those comprised by the BJT sensing pixel 100 and thus are not detailed for brevity. Compared to the embodiment of FIG. 1, the difference is that the drain terminal D3 of source follower transistor sf1 of BJT sensing pixel 500_1 at the first row and first column of pixel array 605 is coupled to a first input end of the column-based comparison circuit 608, the drain terminal D4 of source follower transistor sf2 of BJT sensing pixel 500_1 is coupled to a second input end of the column-based comparison circuit 608, the drain terminal D1 of source follower transistor sf1 of BJT sensing pixel 500_2 at the second row and first column of pixel array 605 is coupled to the first input end of the column-based comparison circuit 608, the drain terminal D2 of source follower transistor sf2 of BJT sensing pixel 500_2 is coupled to the second input end of the column-based comparison circuit 608, and the output signals OUT and OUTD of all the BJT sensing pixels 500_1 and 500_2 at the same column are coupled to the column-based bias current source 607 which has another end coupled to the ground level and is used to providing the bias current such as 5 uA for the output signals OUT and OUTD.

Each built-in column-based comparison circuit 608 as shown in FIG. 5 and FIG. 6 comprises transistors m50, m51, m52, and m53. The PMOS transistor m50 has a first terminal (e.g. a drain terminal) coupled to the drains terminals (i.e. D3 and D1) of first source follower transistors sf1 of all the BJT sensing pixels 500_1 and 500_2 disposed at the same column, has a second terminal (e.g. a source terminal) coupled to the supply voltage vdda such as 1.8 Volts (but not limited), and has a control terminal (e.g. a gate terminal) coupled to its drain terminal. The PMOS transistor m51 has a first terminal (e.g. a drain terminal) coupled to the drains terminals (i.e. D4 and D2) of second source follower transistors sf2 of all the BJT sensing pixels 500_1 and 500_2 disposed at the same column, has a second terminal (e.g. a source terminal) coupled to the supply voltage vdda, and has a control terminal (e.g. a gate terminal) coupled to the gate terminal of the PMOS transistor m50. The PMOS transistor m52 has a first terminal (e.g. a drain terminal) coupled to an output of the M built-in comparison circuit 608 and at which a comparison resultant bit/signal (e.g. OUT_1) for one of the BJT sensing pixels 500_1/500_2 at the same column is generated and outputted, has a second terminal (e.g. a source terminal) coupled to the supply voltage vdda, and has a control terminal (e.g. a gate terminal) coupled to the drain terminal of the PMOS transistor m51. The PMOS transistor m53 has a first terminal (e.g. a drain terminal) coupled to the output of the M built-in comparison circuit (or coupled to the drain terminal of the transistor m52), has a second terminal (e.g. a source terminal) coupled to the ground level, and has a control terminal (e.g. a gate terminal) coupled to a bias voltage nbias.

As shown in FIG. 5, for example (but not limited), the two source follower transistors sf1 and sf2 within a BJT sensing pixel 500_1 (or 500_2) in FIG. 5 can form into a differential pair of a comparator.

The drain terminals D3 & D4 of the two source follower transistors sf1 and sf2 are routed out from the BJT sensing pixel 500_1 in FIG. 5 to build a top part of a comparator circuit. In addition, the drain terminals D1 & D2 of the two source follower transistors sf1 and sf2 can be routed out from the BJT sensing pixel 500_2 in FIG. 5 to build a top part of a comparator circuit.

The first output signal OUT and second output signal OUTD are transmitted from the BJT sensing pixel 500_1 (or 500_2) in FIG. 5 and will be shorted outside of the BJT sensing pixel 500_1 (or 500_2) and will connect to the corresponding bias current (e.g. 5 uA) if the current source 607 at the same column so as to form a bottom part of the comparator.

Thus, when the control signal RD1 (i.e. a read control signal to read pixel data at a first row) becomes high level '1', the BJT sensing pixel 500_1 at the first row and at the first column is selected (the transistors m8 and m12 of the BJT sensing pixel 500_1 are enabled and turned on by the control signal RD1 while the transistors m8 and m12 of the BJT sensing pixel 500_2 are not turned on by the control signal RD2 since in this situation the other read control signal such as RD2 is at the low level).

Alternatively, when the control signal RD2 (i.e. a read control signal to read pixel data at a second row following the first row) becomes high level '1', the BJT sensing pixel 500_2 at the second row and first column is selected (the transistors m8 and m12 of the BJT sensing pixel 500_2 are enabled and turned on by the control signal RD2 while the transistors m8 and m12 of the BJT sensing pixel 500_1 are not turned on by the control signal RD1 since in this situation the other read control signal such as RD1 is at the low level).

For this circuit structure and connection of the BJT sensing pixel 500_1 (or 500_2), if the voltage level of its first output signal OUT is higher than that of its second output signal OUTD, then the comparison resultant bit, indicated by OUT_1, generated from the corresponding comparison circuit is equal to '0'.

Figure 7:
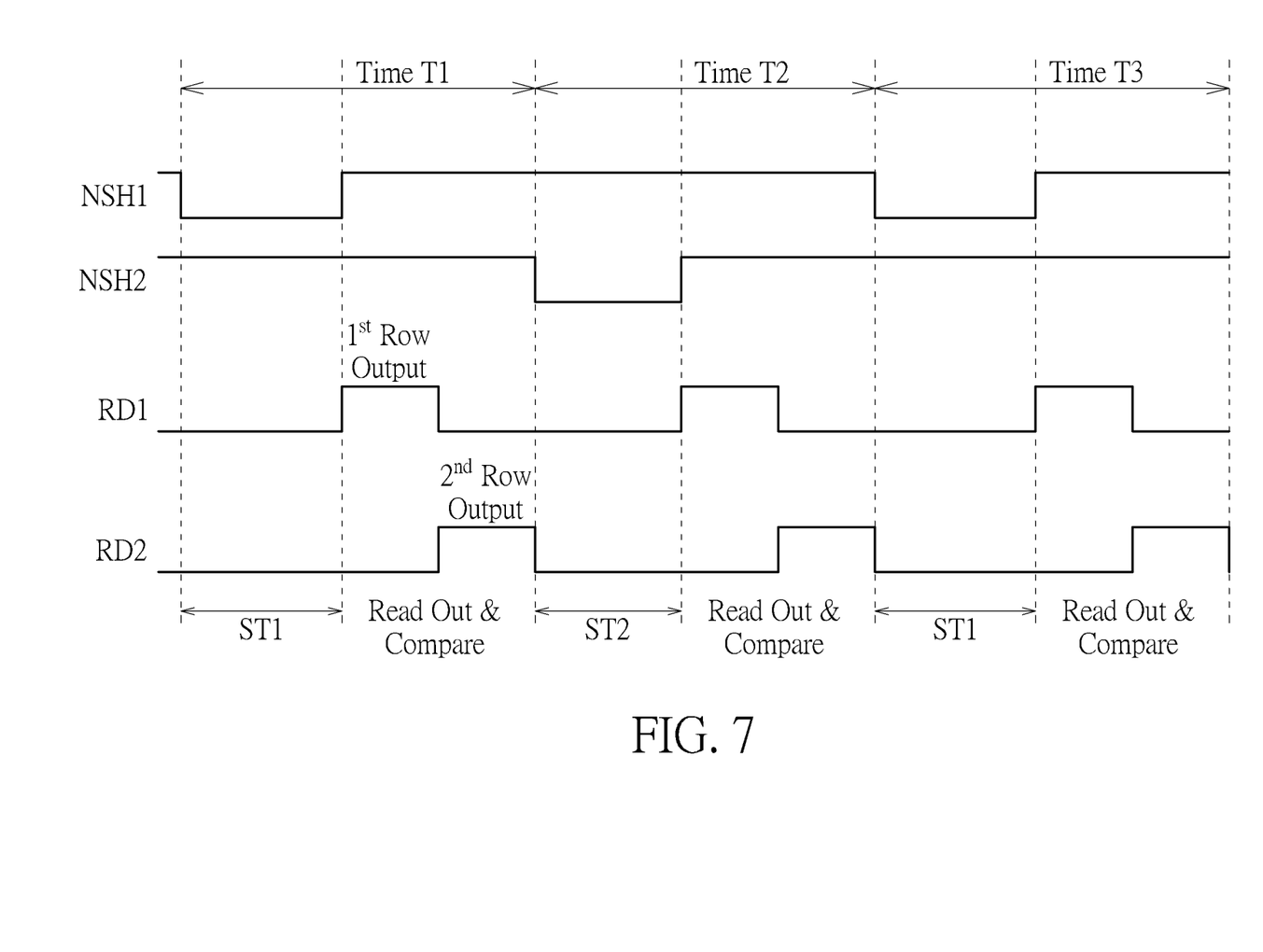
FIG. 7 is a diagram of an example of the control signals NSH1 and NSH2 and the read controls signals RD1 and RD2 of FIG. 5 according to an embodiment of the invention.

FIG. 7 is a diagram of an example of the control signals NSH1 and NSH2 and the read controls signals RD1 and RD2 of FIG. 5 according to an embodiment of the invention. In the embodiment, the first integration capacitors INT of the BJT sensing pixel 500_1 and 500_2 are used to store the light signal collected during the first shutter exposure time interval ST1 (e.g. a longer exposure time interval such as 10 us) of time T1, and the second integration capacitors INTD of the BJT sensing pixel 500_1 and 500_2 are used to store the light signal collected during the second shutter exposure time interval ST2 (e.g. a shorter exposure time interval such as 9 us) of a time earlier than time T1 (not shown in FIG. 7).

During time's T1 read out and compare time interval following the time interval ST1, when the read control signal RD1 becomes high and read control signal RD2 becomes low, the output signals OUT and OUTD of all the BJT sensing pixels at the same row such as the first row of pixel array 605 are read out and compared to respectively generate and output the comparison resultant bits/signals OUT_1-OUT_30 into the control circuit 610, as shown in FIG. 6. Later, when the read control signal RD2 becomes high and read control signal RD1 becomes low, the output signals OUT and OUTD of all the BJT sensing pixels at the same row such as the second row of pixel array 605 are read out and compared again to respectively generate and output the comparison resultant bits/signals OUT_1-OUT_30 into the control circuit 610, as shown in FIG. 6. Thus, in this situation, the control circuit 610 can receive N×M comparison resultant bits, e.g. 2×30 comparison resultant bits. Since the first output signal OUT corresponds to the longer shutter exposure time interval ST1 compared to the second output signal OUTD, the voltage level of first output signal OUT will be higher than that of the second output signal OUTD if no motions occur, and thus a comparison resultant bit such as OUT_1 ideally should be equal to '1'. If a motion occurs, then the comparison resultant bit toggle to '0'. Thus, the control circuit 610 can employ the counter 215 to count for the number of specific bits '0' indicating significant pixel change and then compare the total number of specific bits '0' at time T1 with a number threshold to resultantly determine whether a motion occurs at time T1.

Similarly, at time T2, the second integration capacitors INTD of the BJT sensing pixel 500_1 and 500_2 are used to store the light signal collected during the second shutter exposure time interval ST2 at time T2. During time's T2 read out and compare time interval following the time interval ST2, when the read control signal RD1 becomes high and read control signal RD2 becomes low, the output signals OUT and OUTD of all the BJT sensing pixels at the same row such as the first row of pixel array 605 are read out and compared to respectively generate and output the comparison resultant bits/signals OUT_1-OUT_30 into the control circuit 610. Later, when the read control signal RD2 becomes high and read control signal RD1 becomes low, the output signals OUT and OUTD of all the BJT sensing pixels at the same row such as the second row of pixel array 605 are read out and compared again to respectively generate and output the comparison resultant bits/signals OUT_1-OUT_30 into the control circuit 610. Thus, in this situation, the control circuit 610 at time T2 can also receive N×M comparison resultant bits, e.g. 2×30 comparison resultant bits. Since the second output signal OUTD corresponds to the shorter shutter exposure time interval ST2 compared to the first output signal OUT, the voltage level of first output signal OUT will be higher than that of the second output signal OUTD if no motions occur, and thus a comparison resultant bit such as OUT_1 ideally should be equal to '1'. If a motion occurs, then the comparison resultant bit toggle to '0'. Thus, the control circuit 610 can employ the counter 215 to count for the number of specific bits '0' indicating significant pixel change and then compare the total number of specific bits '0' at time T1 with a number threshold to resultantly determine whether a motion occurs at time T2. These operations and functions at time T3 or later time are similar to the above-mentioned operations and functions of the circuits in the above previous paragraphs.

Further, it should be noted that the first integration capacitor INT will be overwritten by the light signal collected during the longer shutter exposure time interval ST1 of time T3, and the second integration capacitor INTD will be overwritten by the light signal collected during the shorter shutter exposure time interval ST1 of later time T4 (not shown in figure)).

An advantage is that the embodiment of the circuit design/structure in FIG. 5 in conjunction with FIG. 6 consumes only 5 uA per pixel unit compared to the embodiment in FIG. 1 in conjunction with FIG. 2 which may need to consume 160 uA per pixel unit, to transfer/transmit each pixel signal to the external comparator or comparator circuit. For instance, the current provided by each of the current sources CS1 and CS2 may be equal to 160 uA while that provided by each column current source may merely consume 5 uA which is significantly smaller than 160 uA.

Further, as shown in FIG. 7, it is merely needed to use a shorter transfer time compared to the embodiment of FIG. 2 since it operates one row by one row. For example (but not limited), to achieve the pixel transfer of the all the pixel units arranged in 30 rows and 30 columns, the optical sensor device 600 merely needs transfer the pixel data for 30 times to complete the read out of all pixel values of one image/frame, rather than transferring the pixel data for 900 times.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensor device, comprising:
    a pixel array having a plurality of pixel units arranged in N rows and M columns, a first pixel unit in the plurality of pixel units comprising:
        a photo transistor, configured to capture and generate a first image signal during a first shutter exposure time interval of a first time and to capture and generate a second image signal during a second shutter exposure time interval of a second time, the first time and the second time being consecutive;
        a first integration capacitor, coupled to the photo transistor, for storing the first image signal; and
        a second integration capacitor, coupled to the photo transistor, for storing the second image signal; and
    a control circuit, coupled to the first pixel unit;
    wherein the first shutter exposure time interval is different from the second shutter exposure time interval; the control circuit performs a motion detection to determine whether a motion occurs according to a difference between the first image signal captured during the first shutter exposure time interval and the second image signal captured during the second shutter exposure time interval; the first pixel unit outputs the first image signal as a first output signal and outputs the second image signal as a second output signal respectively into the control circuit; the control circuit is used to compare the first output signal with the second output signal, which is biased by different threshold voltages, to generate a first comparison resultant bit and a second comparison resultant bit into a counter of the control circuit; and, the counter is used to increment a counting vale by one only when the first comparison resultant bit and the second comparison resultant bit are identical.

2. The optical sensor device of claim 1, wherein the photo transistor is a bipolar junction transistor (BJT), and the first pixel unit is a BIT sensing pixel.

3. The optical sensor device of claim 1, wherein the first shutter exposure time interval and the second shutter exposure time interval alternately occur for consecutive times.

4. The optical sensor device of claim 1, wherein the control circuit compares the first image signal with the second image signal to preliminarily determine whether a motion occurs.

5. The optical sensor device of claim 4, wherein the second shutter exposure time interval is shorter than the first shutter exposure time interval when the first time is followed by the second time; the control circuit determines that no motions occur at the second time when the second image signal is dimmer than the first image signal; and the control circuit determines that a motion occurs when the second image signal is brighter than the first image signal.

6. The optical sensor device of claim 4, wherein the second shutter exposure time interval is shorter than the first shutter exposure time interval when the second time is followed by the first time; the control circuit determines that no motions occur when the second image signal is brighter than the first image signal; and, the control circuit determines that a motion occurs when the second image signal is dimmer than the first image signal.

7. The optical sensor device of claim 1, wherein the control circuit comprises:
    a first current source, coupled to the second output signal sent from the first pixel unit;
    a second current source, coupled to the first output signal sent from the first pixel unit;
    a first buffer capacitor, for storing the second output signal;
    a second buffer capacitor, for storing the first output signal;
    a first switch unit, disposed between and selectively coupled between the first buffer capacitor and the second output signal;
    a second switch unit, disposed between and selectively coupled between the second buffer capacitor and the first output signal; and
    a comparator, coupled to the first buffer capacitor and the second buffer capacitor, for comparing the first output signal with the second output signal, which is biased by the different threshold voltages, to generate the first comparison resultant bit and the second comparison resultant bit into the counter.

8. The optical sensor device of claim 7, wherein the control circuit dynamically adjust the different threshold voltages for different pixel units in response to different light intensities, and compares the first image signal with the second image one pixel unit by one pixel unit.

9. The optical sensor device of claim 1, wherein the second shutter exposure time interval is determined based on a first light intensity, a first shot noise level of the first light intensity, a second light intensity, and a second shot noise level of the second light intensity; the first shot noise level is lower than the second shot noise level when the second light intensity is higher than the first light intensity.

10. The optical sensor device of claim 1, wherein the pixel array further comprises:
    M column-based bias current sources, each column-based bias current source providing a bias current for output signals sent from pixel units disposed at a corresponding column;
    M column-based comparison circuits, coupled to the pixel units disposed at the corresponding column, each column-based comparison circuit being used to compare the output signals to generate and output a corresponding comparison resultant bit into the control circuit in response to a specific read control signal of a specific row, sent from the control circuit.

11. The optical sensor device of claim 10, wherein the control circuit comprises a counter, and the counter counts for multiple comparison resultant bits of all pixel units of the pixel array to generate a number of specific bits indicating significant pixel change and then compares the number of specific bits with a number threshold to resultantly determine whether a motion occurs.

12. The optical sensor device of claim 10, wherein the M column-based comparison circuits of the pixel array simultaneously generate M comparison resultant bits of pixel units at the specific row in response to the specific read control signal of the specific row.

13. A method of an optical sensor device, comprising:
providing a pixel array having a plurality of pixel units arranged in N rows and M columns, a first pixel unit in the plurality of pixel units comprising:
a photo transistor, configured to capture and generate a first image signal during a first shutter exposure time interval of a first time and to capture and generate a second image signal during a second shutter exposure time interval of a second time, the first time and the second time being consecutive;
a first integration capacitor, coupled to the photo transistor, for storing the first image signal; and
a second integration capacitor, coupled to the photo transistor, for storing the second image signal; and
configuring the first shutter exposure time interval to be different from the second shutter exposure time interval;
performing a motion detection to determine whether a motion occurs according to a difference between the first image signal captured during the first shutter exposure time interval and the second image signal captured during the second shutter exposure time interval;
providing a comparator to comparing a first output signal with a second output signal, which is biased by different threshold voltages, to generate a first comparison resultant bit and a second comparison resultant bit into a counter, the first pixel unit outputting the first image signal as the first output signal and outputting the second image signal as the second output signal respectively; and
incrementing a counter's counting vale by one only when the first comparison resultant bit and the second comparison resultant bit are identical.

14. The method of claim 13, wherein the first shutter exposure time interval and the second shutter exposure time interval alternately occur for consecutive times.

15. The method of claim 13, further comprising:
comparing the first image signal with the second image signal to preliminarily determine whether a motion occurs.

16. The method of claim 15, wherein the second shutter exposure time interval is shorter than the first shutter exposure time interval when the first time is followed by the second time; and, the method comprises:
determining that no motions occur at the second time when the second image signal is dimmer than the first image signal; and
determining that a motion occurs when the second image signal is brighter than the first image signal.

17. The method of claim 15, wherein the second shutter exposure time interval is shorter than the first shutter exposure time interval when the second time is followed by the first time; and, the method further comprises:

determining that no motions occur when the second image signal is brighter than the first image signal; and
determining that a motion occurs when the second image signal is dimmer than the first image signal.

18. The method of claim 13, wherein the method further comprises:
providing a first current source coupled to the second output signal sent from the first pixel unit;
providing a second current source coupled to the first output signal sent from the first pixel unit;
providing a first buffer capacitor to store the second output signal;
providing a second buffer capacitor to store the first output signal;
providing a first switch unit, disposed between and selectively coupled between the first buffer capacitor and the second output signal; and
providing a second switch unit, disposed between and selectively coupled between the second buffer capacitor and the first output signal.

19. The method of claim 18, where the method further comprises:
dynamically adjusting the different threshold voltages for different pixel units in response to different light intensities, and comparing the first image signal with the second image one pixel unit by one pixel unit.

20. The method of claim 13, wherein the method further comprises:
determining the second shutter exposure time interval based on a first light intensity, a first shot noise level of the first light intensity, a second light intensity, and a second shot noise level of the second light intensity; the first shot noise level is lower than the second shot noise level when the second light intensity is higher than the first light intensity.

21. The method of claim 13, wherein the pixel array further comprises:
M column-based bias current sources, each column-based bias current source providing a bias current for output signals sent from pixel units disposed at a corresponding column;
M column-based comparison circuits, coupled to the pixel units disposed at the corresponding column, each column-based comparison circuit being used to compare the output signals to generate and output a corresponding comparison resultant bit into the control circuit in response to a specific read control signal of a specific row, sent from the control circuit.

22. The method of claim 21, wherein the method further comprises:
providing a counter to count for multiple comparison resultant bits of all pixel units of the pixel array to generate a number of specific bits indicating significant pixel change; and
comparing the number of specific bits with a number threshold to resultantly determine whether a motion occurs.

23. The method of claim 21, wherein the M column-based comparison circuits of the pixel array simultaneously generate M comparison resultant bits of pixel units at the specific row into in response to the specific read control signal of the specific row.

* * * * *